United States Patent

[11] 3,596,401

| | | |
|---|---|---|
| [72] | Inventor | Arthur J. Camire<br>14422 S. Louie, Riverdale, Ill. 60627 |
| [21] | Appl. No. | 12,382 |
| [22] | Filed | Feb. 18, 1970 |
| [45] | Patented | Aug. 3, 1971 |

[54] VEHICLE GUIDANCE SYSTEMS
7 Claims, 9 Drawing Figs.

[52] U.S. Cl. .................................................. 46/244 R
[51] Int. Cl. ................................................... A63h 17/36
[50] Field of Search ...................................... 46/213, 243, 244, 239

[56] References Cited
UNITED STATES PATENTS

| | | | | |
|---|---|---|---|---|
| 2,691,946 | 10/1954 | Marmo | | 46/244 R |
| 2,794,929 | 6/1957 | Adamski | | 46/239 X |
| 2,857,710 | 10/1958 | Brown | | 46/239 |
| 3,083,503 | 4/1963 | Zalkind | | 46/244 R |
| 3,266,187 | 8/1966 | Felsher | | 46/239 |

*Primary Examiner*—Louis G. Mancene
*Assistant Examiner*—Robert F. Cutting
*Attorney*—Jerry B. Cesak ABSTRACT: A toy-type vehicle carries a movable magnet for detecting a guide wire in the roadbed. Movement of the magnet actuates magnetic switch means in circuit with motors driving the vehicle wheels, so that the vehicle is steered by driving along a path predetermined by the guide wire. In another embodiment the magnetic switch means control a steering motor of a dirigible vehicle wheel.

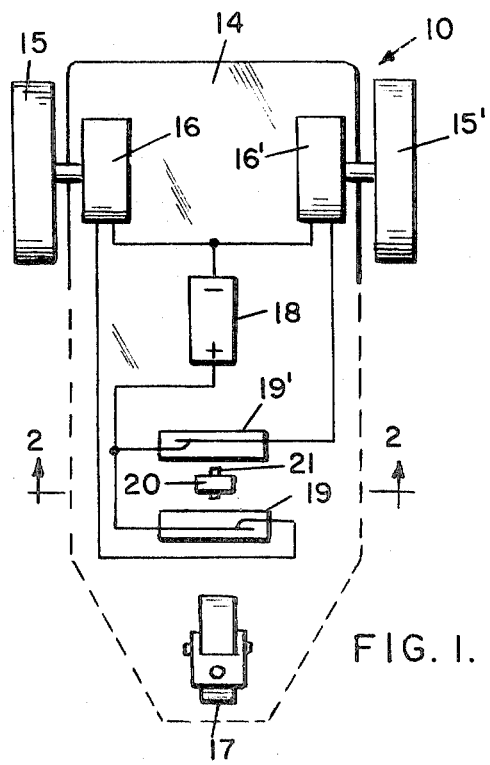
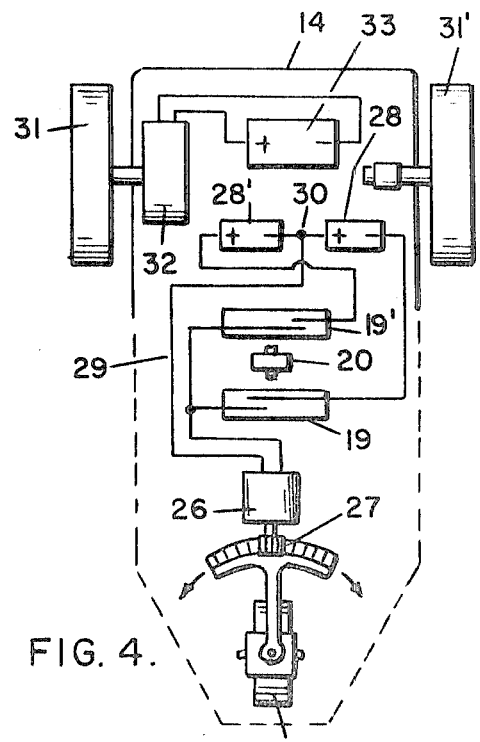
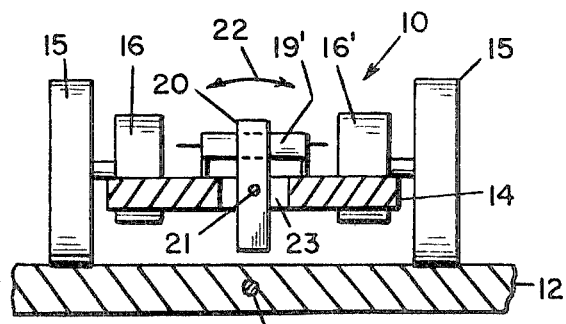
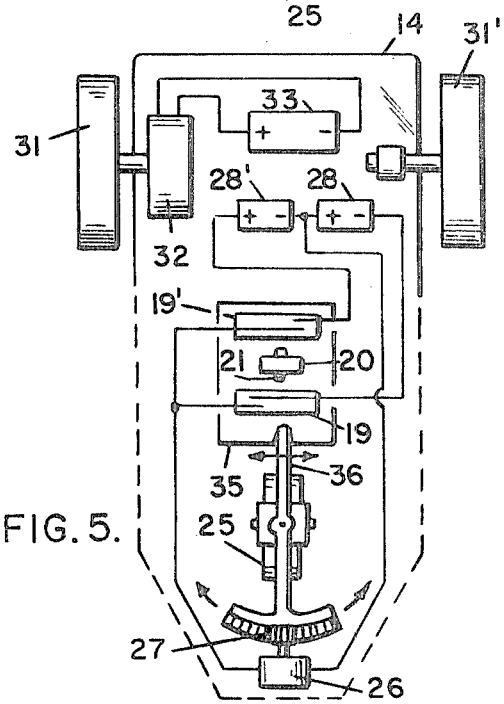
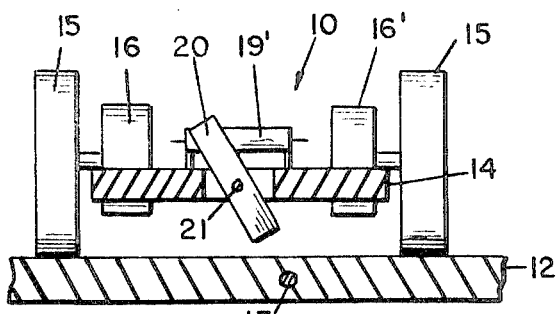
INVENTOR:
ARTHUR J. CAMIRE

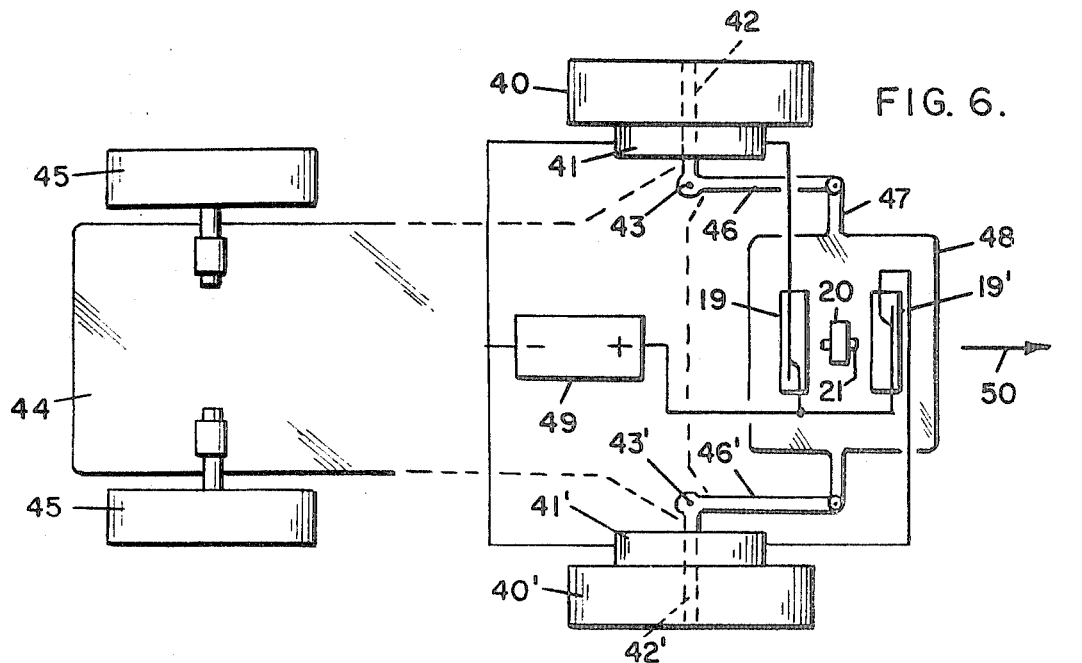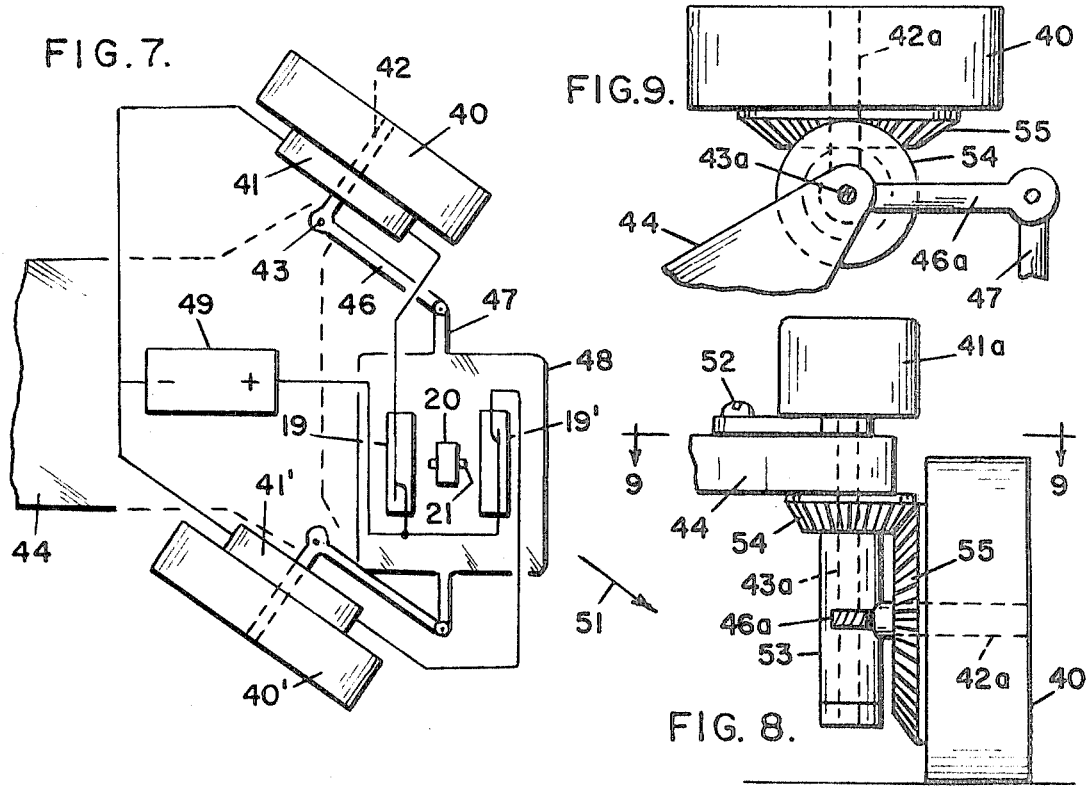

VEHICLE GUIDANCE SYSTEMS

This invention relates to new and useful improvements in guidance systems for automotive vehicles, and in particular the invention concerns itself with guidance systems for toy-type, electrically propelled vehicles such as model automobiles, racing cars, amusement cars, et cetera, which are intended to travel along a predetermined path on a roadbed, gameboard, or the like.

The principal object of the invention is to effectively and accurately guide or steer the vehicle along a predetermined path without involving any physical contact and friction between the vehicle and the roadbed other than that of the vehicle wheels, and also without involving any visible physical connection between the vehicle and the roadbed for effecting the steering, so that the vehicle appears to be self-steered, which in fact it is.

Briefly, the object of the invention is attained by providing the vehicle with a movable magnet for detecting a guide wire embedded in the roadbed. Movement of the magnet in following the guide wire actuates magnetic switch means in circuit with electrically actuated wheel means of the vehicle so that the vehicle is steered along a predetermined path of the guide wire, as detected by the magnet. Several embodiments of the invention are disclosed, and in some of these the electrically actuated wheel means are wheels at opposite sides of the vehicle driven by separate motors, either in unison or individually, so that the vehicle is steered by driving. In other embodiments the electrically actuated wheel means is a dirigible wheel which is steered by a reversible motor.

The apparatus of the invention is simple in construction, highly efficient in operation, and lends itself to convenient and economical manufacture with readily available components.

With the foregoing more important object and features in view and such other objects and features which may become apparent as this specification proceeds, the invention will be understood from the following description taken in conjunction with the accompanying drawings, wherein like characters of reference are used to designate like parts, and wherein:

FIG. 1 is a plan view, largely diagrammatic, showing one embodiment of the invention wherein the vehicle is steered by driving;

FIG. 2 is a vertical sectional view, taken substantially in the plane of the line 2-2 in FIG. 1, with the magnet on the vehicle located directly over the guide wire in the roadbed;

FIG. 3 is a view, similar to FIG. 2, but with the magnet at one side of the guide wire;

FIG. 4 is a plan view, largely diagrammatic, showing a modified embodiment wherein the vehicle is steered by a dirigible wheel;

FIG. 5 is a plan view, largely diagrammatic, showing another modified embodiment utilizing a dirigible wheel;

FIG. 6 is a plan view, largely diagrammatic, of another embodiment utilizing steering by driving;

FIG. 7 is a fragmentary plan view of the embodiment of FIG. 6 with the driving-steering wheels turned to one side;

FIG. 8 is a fragmentary elevational view showing a modified drive arrangement such as may be used in place of that shown in FIGS. 6 and 7; and FIG. 9 is a fragmentary horizontal sectional view, taken substantially in the plane of the line 9-9 in FIG. 8.

Referring now to the accompanying drawings in detail, more particularly to FIGS. 1, 2 and 3, the invention comprises a toy-type vehicle designated generally by the numeral 10, which is self-propelled along a predetermined path on a suitable roadbed 12, the path of the vehicle being predetermined by a guide wire 13 of ferrous material which is embedded in the roadbed. The vehicle 10 has a suitable chassis 14, only a portion of which is shown by full lines in FIG. 1 while its remaining portion is indicated by dotted lines, not only because the shape of the chassis may vary, but also because of simplicity of illustration of the guidance components of the invention hereinafter described.

The chassis 14 is supported by a pair of rear driving wheels 15, 15' driven by separate electric motors 16, 16', and at the front the chassis is provided with a caster wheel 17. This arrangement permits the vehicle to travel in a straight forward direction when both the wheels 15, 15' are driven by the motors 16, 16', and it also permits steering by driving, that is to say, driving by either of the motors 16, 16' while the other motor is idling, which causes the vehicle to turn in one direction or the other, while the caster wheel 17 is self-deflected accordingly.

The two motors 16, 16' are connected in parallel to one pole of a battery 18 on the chassis 14, and are also connected in series with a pair of magnetic reed switches 19, 19', respectively, to the other pole of the battery, as will be apparent from FIG. 1. The switches 19, 19' are of the well-known type, adapted to be opened or closed in response to movement of an adjacently disposed bar magnet 20. The latter is pivotally mounted on the chassis 14, as by a horizontal fulcrum pin 21 disposed longitudinally of the chassis, so that the magnet is swingable transversely of the chassis in a vertical plane, as indicated at 22 in FIG. 2. Conveniently, the magnet 20 may extend through a recess 23 in the chassis so that its upper end portion is disposed between the two switches 19, 19' and its lower end is closely adjacent to the roadbed 12 for detecting and coacting with the guide wire 13.

The switches switches 19, 19' are disposed in parallel to the plane of movement of the magnet 20 and the contact points of the reeds of one switch are at one side of the fulcrum pin 21, while those of the other switch are at one side of the pin. When the vehicle is in such position on the roadbed 12 that the fulcrum pin 21 is directly above the guide wire 13 as shown in FIG. 2, attraction of the guide wire by the magnet places the magnet in a vertical position in which both switches 19, 19' are closed. This causes both motors 16, 16' to be energized by the battery 18 so that both wheels 15, 15' are driven, and the vehicle is propelled forwardly in a straight line. However, if the guide wire 13 is curved, as for example in order to steer the vehicle around a corner, the straight forward movement of the vehicle initially places the fulcrum pin 21 to one side of the guide wire 13, for example as shown in FIG. 3, and the magnet 20 assumes a slanted position with its lower end being oriented laterally toward the guide wire. Movement of the magnet to this slanted position opens the switch 19' while the switch 19 remains closed, and thus only the motor 16 is energized by the battery 18 while the motor 16' is idling. As a result, only the wheel 15 is positively driven and the front end portion of the vehicle is steered toward the opposite side, until the fulcrum pin 21 of the magnet 20 is again directly above the guide wire 13 and both switches 19, 19' become closed to reestablish positive drive to both wheels 15, 15' by both motors 16, 16'. If the curvature of the guide wire 13 extends over some distance, the already-described steering action may occur sequentially until a straight stretch of guide wire is again encountered. It is preferable to arrange the switches 19, 19' in relation to the fulcrum 21 of the magnet 20 so that when there is no attraction of the guide wire by the magnet, the magnet is bistable and will remain in the position to which it was last slanted, thus continuing steering in the last-initiated direction until the guide wire is again sensed by the magnet. It will be understood that the already-described steering by driving in terms of the wheel 15 is also applicable to the wheel 15' when the magnet 20 is slanted in a direction opposite to that shown in FIG. 3 and the switch 19 is opened while the switch 19' remains closed for energizing the motor 16' only.

A single, double-acting switch may be used in place of the two switches 19, 19', as long as it is capable of providing current flow selectively to both motors, or to either in exclusion of the other. For simplicity of illustration the drawings do not show a master switch for interrupting current flow from the battery when the device is not in use.

FIG. 4 illustrates a modified embodiment of the invention which, unlike the embodiment of FIGS. 1-3 which is steered by driving, is steered by a dirigible front wheel 25. Steering movement of the wheel 25 is effected positively by a reversible electric motor 26 which is operatively connected to the wheel 25 in any suitable manner, as by a toothed segment and pinion drive 27, so that the wheel 25 may be turned to either side of a straight-ahead position by rotation of the motor 26 in one direction or the other.

The motor 26 is powered selectively by a pair of batteries 28, 28' which are connected to the motor and to the switches 19, 19' so that one battery rotates the motor in one direction and the other battery in the other direction. As will be apparent from FIG. 4, one terminal of the motor 26 is connected by a conductor 29 to a junction point 30 between opposite poles of the two batteries. The remaining poles of the two batteries are connected in series with the respective switches 19, 19' to the other terminal of the motor. When the magnet 20 is in its vertical position over the guide wire, both switches 19, 19' are open and the motor 26 does not rotate while the dirigible wheel 25 is in its straight-ahead position. However, if the magnet 20 becomes slanted to one side or the other by lateral displacement of the vehicle relative to the guide wire, one or the other of the switches 19, 19' will be closed and the motor 26 will rotate in an appropriate direction to steer the wheel 25 and thus bring the magnet 20 back into vertical position over the guide wire.

The embodiment of FIG. 4 also has a pair of rear wheels 31, 31', only one of which is positively driven by a motor 32 powered by a battery 33. The other wheel 31' is freely rotatable and notwithstanding the positive drive to one wheel 31 only, steering is effected by the dirigible wheel 25 as already explained.

Like the embodiment of FIGS. 1-3, the embodiment of FIG. 4 may effect its steering incrementally and sequentially when negotiating curved of substantial length, but another modified embodiment of the invention, shown in FIG. 5, introduces a feedback action to facilitate continuous steering under such conditions. The embodiment of FIG. 5 is substantially the same as that of FIG. 4, except that the two switches 19, 19' are supported by a carrier 35 which is slidable transversely along the chassis 14 relative to the fulcrum pin 21 of the magnet 20. The transverse sliding movement of the carrier 35 is effected by an extension arm 36 on the fulcrum of the dirigible wheel 25, so that steering movement of the wheel 25 to one side or the other from its straight-ahead position slides the carrier 35 to one side or the other from its centralized position with respect to the magnet fulcrum 21.

Thus, if the magnet 20 becomes slanted to one side of its vertical position by lateral displacement of the vehicle relative to the guide wire, one of the switches 19, 19' becomes closed and the steering motor 26 rotates in the appropriate direction to turn the dirigible wheel 25. At the same time, however, the steering movement of the wheel 25 is fed back through the arm 36 and switch carrier 35 so that the switches 19, 19' are moved laterally toward the magnet in its slanted position, with the result that the same one of the switches which was initially closed then opens and steering in the same direction continues without interruption around an extensively curved path until a different turning radius or a straight stretch of guide wire is encountered and the mechanism resets itself to the required turning radius or straight heading.

The preferred embodiment of the invention is shown in FIGS. 6 and 7, in conjunction with FIGS. 8 and 9, the preferred embodiment possessing all the advantages of the feedback action described in connection with FIG. 5 as well as many others. Referring first to FIGS. 6 and 7, the vehicle combines the concepts of steering by driving with those of steering by dirigible wheels, and embodies a front wheel drive represented by a pair of steerable front wheels 40, 40' driven by separate motors 41, 41' on stub axles 42, 42' which are connected by kingpins 43, 43' to the chassis 44, so that the wheels 40, 40' may be turned from a straight-ahead position shown in FIG. 6 to either side, as for example in FIG. 7. The rear portion of the chassis is supported by a pair of freely rotatable wheels 45 which are not driven.

The stub shafts 42, 42' on the kingpins 43, 43' are rigidly connected to tie rod arms 46, 46' which in turn are connected together by a tie rod 47 which retains the two wheels 40, 40' in parallel planes. The tie rod 47 includes a carrier 48 for the switches 19, 19' as well as for the magnet 20, so that when the tie rod is moved transversely of the vehicle, the switches and the magnet are moved together therewith. The two driving motors 41, 41' are connected in parallel to one pole of a battery 49, and in series with the respective switches 19, 19' to the other pole of the battery, as will be clearly apparent. Both switches are normally closed, when the magnet 20 is disposed vertically over the guide wire, thus energizing both the motors 41, 41' and propelling the vehicle in a straight forward direction as indicated at 50.

It is to be particularly noted that when only one of the motors is energized, as for example the motor 41, the associated wheel 40 has a distinct tendency to swing about the axis of the kingpin 43 in the clockwise direction as viewed in FIG. 6, say for example to the position shown in FIG. 7. As long as the other motor 41' is not energized, this tendency of the wheel 40 to swing about the kingpin 43 produces an actual turning movement, which is accompanied by a corresponding movement of the wheel 40' because of the interconnection afforded by the tie rod 47. Thus, by selectively driving one of the wheels 40, 40' or the other, steering in the desired direction is accomplished. When both wheels are positively driven by the two motors, their tendency to turn about their respective kingpins 43 in respectively opposite directions is neutralized through the medium of the tie rod 47, with the result that the wheels remain in their straight-ahead position for a straight forward drive of the vehicle.

As already indicated, the straight forward propulsion prevails as long as the magnet 20 is located vertically above the guide wire in the roadbed and the two switches 19, 19' are closed. However, if the vehicle becomes displaced laterally with respect to the guide wire so that the magnet 20 becomes slanted to one side or the other on its fulcrum 21, one of the switches 19, 19' becomes opened and only one of the motors 41, 41' remains energized, thus producing the necessary steering by driving action of the steerable wheels 40, 40' to return the vehicle to its normal, centralized position with respect to the guide wire. The steering movement of the wheels 40, 40', as for example from the position in FIG. 6 to that in FIG. 7, inherently produces lateral shifting of the tie rod 47 and carrier 48, so that the switches 19, 19' as well as the magnet 20 on the carrier are translated laterally in the direction of the turn, as indicated for example by the arrow 51 in FIG. 7. Thus, the detector magnet 20 becomes repositioned, first from an initial vertical position to a slanted position and subsequently from its slanted position to a vertical position where it is again above the guide wire, and since in the last-mentioned position of the magnet both switches 19, 19' are again closed, it follows that both wheels 40, 40' are then driven while they are still in their laterally turned position and while the vehicle is still negotiating an extensive curve of travel, as dictated by the guide wire. Of course, the operation is reversed and the apparatus resets itself to a straight-ahead position when a straight stretch of guide wire is encountered.

It is particularly significant to note that with the arrangement of FIGS. 6 and 7, both wheels 40, 40' are driving while the vehicle travels along a long stretch of a curve, and a fixed turning radius may be held by application of equal torque, although not necessarily equal power, to the two driving wheels, inasmuch as the wheel at the outside of the curve rotates faster than that on the inside. Also, since the front wheels are driven, the vehicle is pulled rather than pushed, and by shaping the chassis so as to afford clearance around the kingpins 43, 43', the wheels 40, 40' may be steered to as much as 90° from the straight-ahead position, so that the turning radius is virtually shorter than the vehicle itself.

In place of providing the driving motors 41, 41' directly on the stub shafts 42, 42' of the wheels 40, 40', it may be preferable to mount the motors on the chassis 44 as illustrated in FIGS. 8 and 9 wherein a typical drive motor 41a is mounted on the chassis 44 by suitable bracket means 52, and the vertically disposed armature or drive shaft 43a of the motor serves as the kingpin for a steering knuckle 53. The latter is provided with a stub shaft 42a for the wheel 40, and also with an arm 46a for connection to the tie rod 47. The shaft 43 has secured thereto a bevel gear 54 meshing with a bevel gear 55 secured to the wheel 40, so that when the shaft 43a is rotated by the motor 41a, rotation is imparted to the wheel 40, preferably with a speed reduction facilitated by the gears 54, 55. The steering knuckle 53 is rotatable on the shaft 43a independently of the shaft rotation, and steering is effected by the tendency of the wheel 40, when driven, to turn about the shaft 43a, unless such tendency is counteracted by an opposing tendency of the driven wheel at the other side of the vehicle.

In all the embodiments of the invention which utilize steering by driving, a differential effect is obtained when the wheel on one side is driven while the wheel on the opposite side is idling, this permitting travel of the vehicle around a curve without any wheel slippage or waste of power.

It may be also noted that while the drawings for clarity of illustration show the detector magnet 20 and the switches 19, 19' on a relatively large scale, these components are commercially available in a very small size so that the guidance unit comprising the magnet and switches may be accommodated in a compact space, say on the order of a ¾-inch cube.

In all the steering-by-driving embodiments of the invention, such as those in FIGS. 1—3, 6—7 and 8—9, the steering by driving effect need not be obtained by energizing the wheel motor at one side and deenergizing the wheel motor at the opposite side. Rather, it may be obtained by energizing both motors continuously but varying the power so that one wheel has a greater driving torque than the other. In such an arrangement the two control switches 19, 19' would be replaced by another control device such as a rheostat in circuit with both motors, the rheostat having a slidable contact arm actuated by movement of the detector magnet 20 so that current supply to one wheel motor is increased while that to the other wheel motor is proportionately decreased, whereby to obtain the unbalanced driving torque and resultant steering by driving. This allows a continuously variable steering response so that any turning radius can be changed and/or held as compared to sequential negotiation of a turn in short straight sections as with on-off drive. Except when FIG. 8 and 9 wheels are locked from rotating around its axle. FIG. 6—7 and 8—9 can be manually rotated around their kingpin with drive either on or off without damage providing a ruggedness against rough handling.

What I claim as new is:

1. The combination of a vehicle which includes electrically actuated wheel means for steering the same on a roadbed provided with a magnetically cooperative guide element for guiding the vehicle along a predetermined path, and guidance means carried by said vehicle and comprising a detector magnet attractable by the roadway guide element and swingable in a plane transverse of the vehicle, and magnetic switch means responsive to movement of said magnet, said switch means being in circuit with a source of current and with said electrically actuated wheel means so that the vehicle may be steered along he predetermined path of the guide element as detected by said magnet.

2. The combination as defined in claim 1 which is further characterized in that said vehicle is steered by driving, said wheel means including a pair of driving wheels at opposite sides of the vehicle and a pair of electric motors driving the respective wheels, said switch means being operative to selectively energize said motors together or either in exclusion of the other.

3. The combination as defined in claim 1 wherein said wheel means includes at least one dirigible wheel and electrically actuated means for steering the same.

4. The combination as defined in claim 3 wherein said electrically actuated means for steering said dirigible wheel comprise a reversible motor operatively connected to said wheel.

5. The combination as defined in claim 3 which is further characterized in that said switch means are movable transversely of the vehicle relative to said magnet, together with means responsive to steering movement of said dirigible wheel for moving said switch means and repositioning the same relative to the magnet by feedback from the steering movement of said wheel.

6. The combination as defined in claim 1 which is further characterized in that said vehicle is steered by driving, said wheel means including a pair of dirigible driving wheels at opposite sides of the vehicle and a pair of electric motors driving the respective wheels, said switch means being operative to selectively energize said motors together or either in exclusion of the other, and a transverse tie rod connecting said pair of wheels together.

7. The combination as defined in claim 6 which is further characterized in that said magnet and said switch means are carried by said tie rod and are thereby movable transversely of the vehicle for repositioning the magnet by feedback from the steering movement of said wheels.